United States Patent [19]
Fukutani

[11] Patent Number: 5,647,672
[45] Date of Patent: Jul. 15, 1997

[54] MEMORY DISK DRIVING APPARATUS

[75] Inventor: Hideshi Fukutani, Yonago, Japan

[73] Assignee: Matsushita Electric Industrial Co., Ltd., Osaka, Japan

[21] Appl. No.: 637,568

[22] Filed: Apr. 25, 1996

[30] Foreign Application Priority Data

Jun. 23, 1995 [JP] Japan ................................. 7-157354

[51] Int. Cl.$^6$ ............................................. F16C 32/06
[52] U.S. Cl. ................................... 384/100; 384/114
[58] Field of Search ........................... 384/100, 114, 384/107, 115

[56] References Cited

U.S. PATENT DOCUMENTS

| | | | |
|---|---|---|---|
| 5,018,881 | 5/1991 | Asada | 384/100 X |
| 5,141,338 | 8/1992 | Asada et al. | 384/114 |
| 5,142,173 | 8/1992 | Konno et al. | 384/107 X |

FOREIGN PATENT DOCUMENTS

| | | |
|---|---|---|
| 57-97920 | 6/1982 | Japan . |
| 60-4617 | 1/1985 | Japan . |
| 60-131045 | 7/1985 | Japan . |

*Primary Examiner*—Thomas R. Hannon
*Attorney, Agent, or Firm*—Panitch Schwarze Jacobs & Nadel, P.C.

[57] ABSTRACT

A memory disk driving apparatus has a dynamic pressure fluid bearing type spindle motor 1, wherein herringbone grooves 12a are formed on the shaft 12. In the dynamic pressure fluid bearing relatively rotatable with the intermediary of the lubricant injected into a gap between the shaft 12 and the sleeve 13; the shaft diameter D is selected 4 mm or less, and the ratio of the radial gap R between the shaft and the sleeve to the diameter D of the shaft (R/D) is between 0.0005 and 0.002.

4 Claims, 9 Drawing Sheets

MEMORY DISK DRIVING APPARATUS

FIELD OF THE INVENTION AND RELATED ART STATEMENT

1. Field of the Invention

The present invention relates to a memory disk driving apparatus which has a spindle motor and is mainly for use in the field of information processing.

The word "disk" as used herein designates all the types of disks for storing information including read-only disks, erasable disks, write-one disks, and combination of the above-mentioned three features and the like, in the form of magnetic type, optical type or opto-magnetic type.

2. Description of the Related Art

Recent years, disk driving apparatus having smaller scale and larger capacity have been rapidly prevailing. There is a strong demand for such memory disk driving apparatus to have high performance, low noisiness, shock-resistance, low power consumption and low contaminant particles.

Bearings for motor are among the components being essential to obtain the required performance. Ball bearings have been widely used for the motors of the disk driving apparatus of each type for driving the disks of 3.5, 2.5 or 1.8 inches type.

Such a disk driving apparatus has an extremely narrow gap (e.g. 0.04 to 0.1 μm in width) between a magnetic disk and a magnetic head thereof. The interpositioning of a dust of larger size than that of the gap causes failures such as the damage of the magnetic disk, the loss of data and the difficulty or disability of reading. Therefore, the magnetic disks and the motor mounted to the disks, as a whole, are enclosed in a sealed housing to prevent the intrusion of dust so that the space of the disk driving apparatus in the sealed chamber can be kept clean.

The proliferation of large-capacity personal computers and the development of multi-media capable of dealing with voice data and image data have been increasing the need for large-capacity memory disk devices of disk driving apparatus type, especially of the type of magnet disk driving apparatus. Since an enlarging of capacity requires making the recording density of the apparatus higher, narrower track pitch of the apparatus is being required increasingly.

Additionally, the need is arising for further improving the non repeatable run out (abbreviated as NRRO) of a motor hub rotating with the disks.

The NRRO is an irregular runout which never synchronizes the rotation, of the total indicated runout of rotating shaft for the disks. NRRO is needed to be as small as possible in order to prevent the error in reading or writing data.

The actual target values of NRRO of motor hubs in the past have been about 0.4μ in the radial direction; currently, however, 0.2μ may be required because of recent narrowing of the track pitch demanded for the enlargement of the capacity. It is estimated that the required value not more than 0.05μ will appear so as to meet further demand for enlargement of the capacity in the future.

It has been known that NRRO of the apparatus is greatly influenced by bearings for the motor which drives and rotates the disks. A ball bearing consists of outer race, inner race, balls, cage, seal and grease. The ball bearings make large dispersion of NRRO depending upon the machine accuracy, the method and control of pre-load, and the accuracy in assembling the ball bearings into the motor.

Among the above, the main factors of the dispersion are the accuracies such as the accuracy (manufacturing tolerance) of the inner race and the outer race, the sphericity of the balls and the size variation of outside diameters of the balls in a unit container assembled. Accordingly, it is recognized difficult to improve NRRO of finished motors greatly from the current range.

Besides, the ball bearings make noises such as the peculiar race noise (the noise occurring when the balls roll on the races) and the self-excited vibration noise of the cage. In contrast to the conventional apparatus which have had the revolutions of 3,600 rpm, the latest apparatus have the revolutions of 7,200 rpm, i.e., the double rotational speed. In the near future, the revolutions of 10,000 rpm will be required. Such a high speed rotation will make the noise level much higher than the conventional use of the ball bearings. And for a demand for low noise level and high speed, the ball bearing comes to the limit of the improvement.

The latest memory disks have been mostly used in the form of removable disks, and in the portable and notebook-sized personal computers. In such cases, it is required to improve the shock-resistance and drop-resistance of the motors. For the conventional ball bearings, however, the acceleration of about 100 G resulting from the shock or drop causes Brinell marks on the race surfaces of the inner and outer races, accompanied with the increase of the noise. Therefore, the ball bearings have reached the limit to the required values on the noise performance corresponding to the shock-resistance and the drop-resistance of actually 200 G or more.

With the demand for the large capacity, the gap between the magnetic disk and the magnetic head is about 0.1μ currently. Still, the requirement is arising for making the gap smaller to achieve higher density. Since it is impossible to lubricate the bearings when the magnetic disks are mounted to the motor, grease-enclosed type bearings are generally used. The shearing force generated by the rotation, however, acts to separate the grease into base oil and thickener of grease, both constituting the grease. In the case that the base oil and/or the thickener of grease are scattered and deposited on the magnetic disks, there occurs a problem that the deposit can easily damage the functions of the magnetic disk driving apparatus, resulting in malfunction.

For the magnetic disk memory devices, additionally, there is a problem that sometimes the electric spark resulting from electric charge on the magnetic disks causes the damage of written data and/or the read error.

OBJECT AND SUMMARY OF THE INVENTION

Considering the problems of the related art, it is an object of the present invention to provide a disk driving apparatus having a high performance of small runout at high revolutions to achieve the large capacity and high density of memory apparatuses, which include memory disks and disk driving apparatus having the highly improved performances on low noise, shock-resistance and fall-resistance and facilitating a low price, a small size and a thin configuration.

It is another object of the invention to provide a disk driving apparatus keeping a stiffness of a motor thereof to reduce the runout with respect to the disk load, an external vibration or the like, while having a low power consumption.

The condition of the disk driving apparatus is selected so that the shaft diameter D is 4 mm or less and the ratio of the radial gap R between the shaft and the sleeve to the shaft diameter D (R/D) ranges from 0.0005 to 0.002. (The radial gap R is defined by R=½·(Ds−D) where Ds is the inner diameter of the sleeve.)

According to the disk driving apparatus of the invention, a disk driving apparatus having a spindle motor of dynamic pressure fluid bearing type is configured such that the shaft diameter D of the dynamic pressure fluid bearing is 4 mm or less and the ratio of the radial gap R between the shaft and the sleeve to the shaft diameter D (R/D) ranges from 0.0005 to 0.002. Thereby the disk driving apparatus has both low power consumption and large capacity. The use of the dynamic pressure fluid bearing leads to low noise and high shock-resistance. The above-mentioned configuration and performance gives the apparatus high performance and low price.

For the disk driving apparatus of 2.5 inches type, high performance is achieved by preferably selecting the shaft diameter of 3 mm or less.

For the disk driving apparatus of 1.8 inches type, high performance is achieved by preferably selecting the shaft diameter of 2.5 mm or less.

The volume specific resistance of the lubricant is preferably selected so as to be $3 \times 10^9$ Ωcm or less.

Thus making the volume specific resistance of the lubricant $3 \times 10^9$ Ωcm or less enables the resistance between the disks and the bracket to be several megohms or less without providing conductive magnetic fluid or earthing device of the rotor or the like. Thereby the damage of data and the read error due to the electric charge and discharge of the disks can be prevented.

A dynamic pressure fluid bearing, as a mechanism, comprises a bearing having a cylindrical shaft and a hollow cylindrical sleeve into which the shaft is inserted with a gap. A plurality of herringbone grooves are formed on either the shaft or the sleeve, and a lubricant fluid (mostly oil or grease) is filled in the radial gap R between the shaft and the sleeve. Thereby the rotation of the shaft or the sleeve causes a pumping action between the herringbone grooves and the lubricant fluid. The shaft and the sleeve are borne each other for the rotation without contacting by keeping the gap between the shaft and the sleeve uniform for 360 degrees angle around the axis.

Lowering the motor current to achieve low power consumption requires lowering the friction torque between the shaft and the sleeve in rotation. On the other hand, the number of the disks mounted to the motor tends to increase for the purpose of enlarging the capacity of the memory disks. Increasing the radial stiffness of the motor is required in order to resist the large weight of a plurality of disks rotating at a high speed and heighten the accuracy of the rotation by reducing the runout. As the radial stiffness of the motor increases, the friction torque also increases generally. Thus the reduction of the friction torque and the increase of the radial stiffness are required to be compatible.

In a dynamic pressure fluid bearing, the friction torque of the bearing part increases in proportion to the third power of the shaft diameter. Therefore, it is preferable to make the shaft diameter small. In the case of selecting the ratio of the radial gap R between the shaft and the sleeve to the outside diameter of the shaft (R/D) the same, increase of the shaft diameter causes the load capacity generated in the herringbone grooves to decrease, resulting in insufficient stiffness. That makes it impossible to improve the accuracy of the rotation of the disk load rotating at a high speed under the condition that the runout is the same.

Accordingly, in view of the friction torque of the bearing part, the effective outside diameter of the shaft is 4 mm or less, especially for the driving apparatus for the disks of small size, i.e. 3.5 inches or less in diameter. Even with the shaft diameter of 4 mm or less, as the ratio of the radial gap R between the shaft and the sleeve to the outside diameter D of the shaft (R/D) increases, the load capacity generated in the herringbone grooves decreases. As the R/D decreases, friction force increases owing to the disappearance of the radial gap in a low temperature, depending on the coefficient of linear expansion of the shaft and the coefficient of linear expansion of the sleeve material constituting the sleeve. That adversely affects the starting and the accuracy of the rotation. Therefore, it is required to very carefully select the range of the radial gap R between the shaft and the sleeve and the range of the ratio of the radial gap R between the shaft and the sleeve to the outside diameter D of the shaft (R/D).

For the driving apparatus for the disks of 3.5 inches or less in diameter, it is empirically found effective to provide the ratio of the radial gap R between the shaft and the sleeve to the outside diameter D of the shaft (R/D) ranging from 0.0005 to 0.002, in view of the friction torque, the load capacity, the stiffness and the manufacturing accuracy. With the R/D below that range, the radial gap is so small (e.g., with the shaft diameter of 3 mm and the R/D of 0.0005, the radial gap being 1.5 μm) that the production is difficult from the viewpoint of the dispersion in the manufacturing accuracy of the shaft and the sleeve. Besides, for such small R/D ratio of 0.0005 the demand for the low power consumption cannot be satisfied due to the increase of the friction torque. In the case that the R/D ratio is above the range, the radial gap is so large (e.g., with the shaft diameter of 3 mm and the R/D of 0.0025, the radial gap being 7.5 μm) that the load capacity is small and causes the difficulty or failure of stably supporting the weight of the disks. Thus, there occurs the increase of the runout and the reduction of the life.

With the volume specific resistance of the lubricant being $3 \times 10^9$ Ωcm or less, the resistance between the disks and the bracket can be several megohms or less without providing conductive magnetic fluid, the earthing device of the rotor or the like. Such configuration can prevent the damage of data and the read error resulting from the electricity buildup of the disks.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENT

Now referring to the FIGS. 1 to 8, elucidation is made on a 2.5 inches-type disk driving apparatus in accordance with a preferred embodiment of the invention below.

Description of the Configuration

Figure 1:
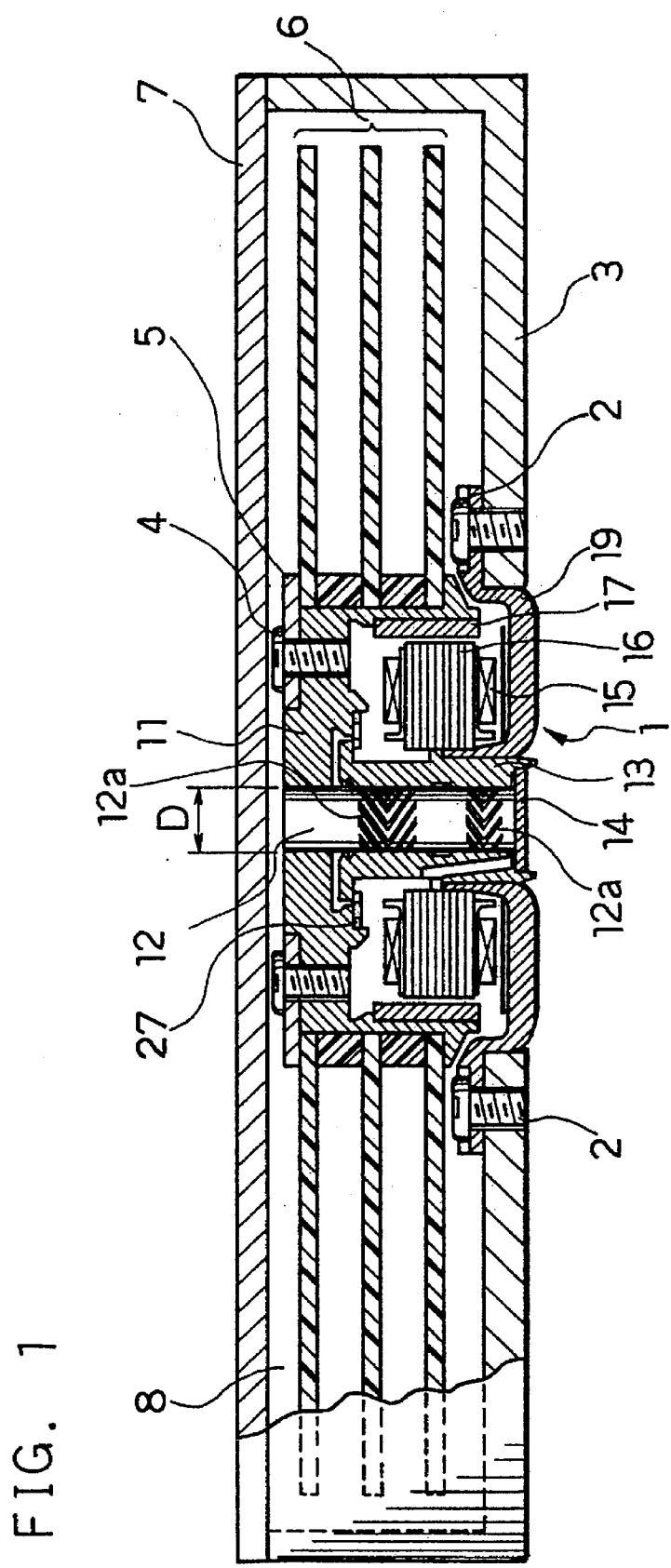
FIG. 1 is a sectional elevation view showing the whole structure of an embodiment of a disk driving apparatus according to the present invention.

As shown in FIG. 1, a motor 1 is affixed to an apparatus housing 3 with screws 2. A plurality of disks 6 are affixed to the motor 1 with screws 4 and clamp rings 5. A space 8 containing the disks 6 is sealed by mounting a cover 7 to the apparatus housing 3 so that the cleanliness in the sealed space can be maintained. Thus, the sealing prevents the failure in the operations when writing or reading data due to the dust or the like interposing into a gap between a head (not shown) and one of the disks 6.

Figure 2:
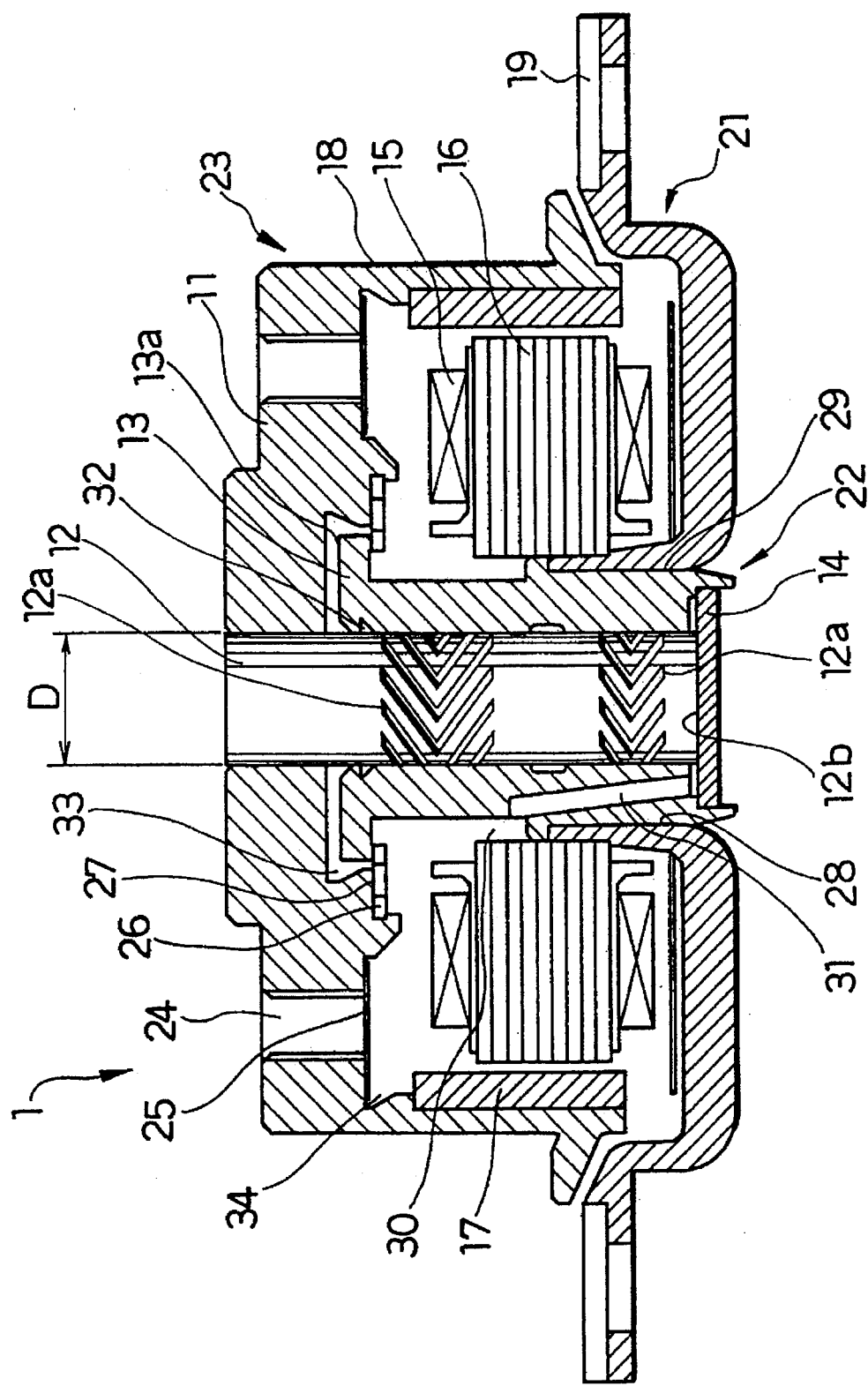
FIG. 2 is an enlarged sectional elevation view of a motor of the embodiment.

Referring to FIGS. 1 and 2, the motor 1 is described below in detail. Describing the configuration with regard to the functions, a hub 11 holding the disks 6 is produced by lathing a block of martensitic stainless steel or free cutting steel. A shaft 12 made of martensitic stainless steel is mounted at the axis of the hub 11. The diameter D of the shaft 12 is 3 mm. The hub 11 rotates together with the disks 6 mounted thereto, around the axis of the shaft 12. The shaft 12 is borne radially by a sleeve 13 made of copper alloy and borne with regard to the thrusting direction by a thrust plate 14 made of martensitic stainless steel or tool steel.

Since the shaft 12, the sleeve 13 and the thrust plate 14 are made of metal material, they have enough mechanical stiffness to resist the load of the disks 6 rotating at a high speed. And also, the shaft 12, the sleeve 13 and the thrust plate 14 allow the machining for heightening the accuracy of the outside diameter of the shaft 12 and the inside diameter of the sleeve 13.

A lubricant fluid such as oil or grease is filled between the shaft 12 and the sleeve 13 and between the shaft 12 and the thrust plate 14. A plurality of e.g. two sets (upper set and lower set) of herringbone grooves 12a are formed on the shaft 12, with a given space in axial direction from each other. When the shaft 12 rotates, the herringbone grooves 12a generate dynamic pressure in the lubricant fluid, which pressure enables the shaft 12 to rotate without contacting the sleeve 13 radially. A plurality sets of herringbone grooves 12a may be formed on the inside surface of the sleeve 13, on the contrary, in place of the outside surface of the shaft 12. Also in this latter case, the rotation without contacting the sleeve 13 in the radial direction is enabled by dynamic pressure in the lubricant fluid in the same way as the case of providing the herringbone grooves on the outside surface of the shaft 12.

Figure 2A:
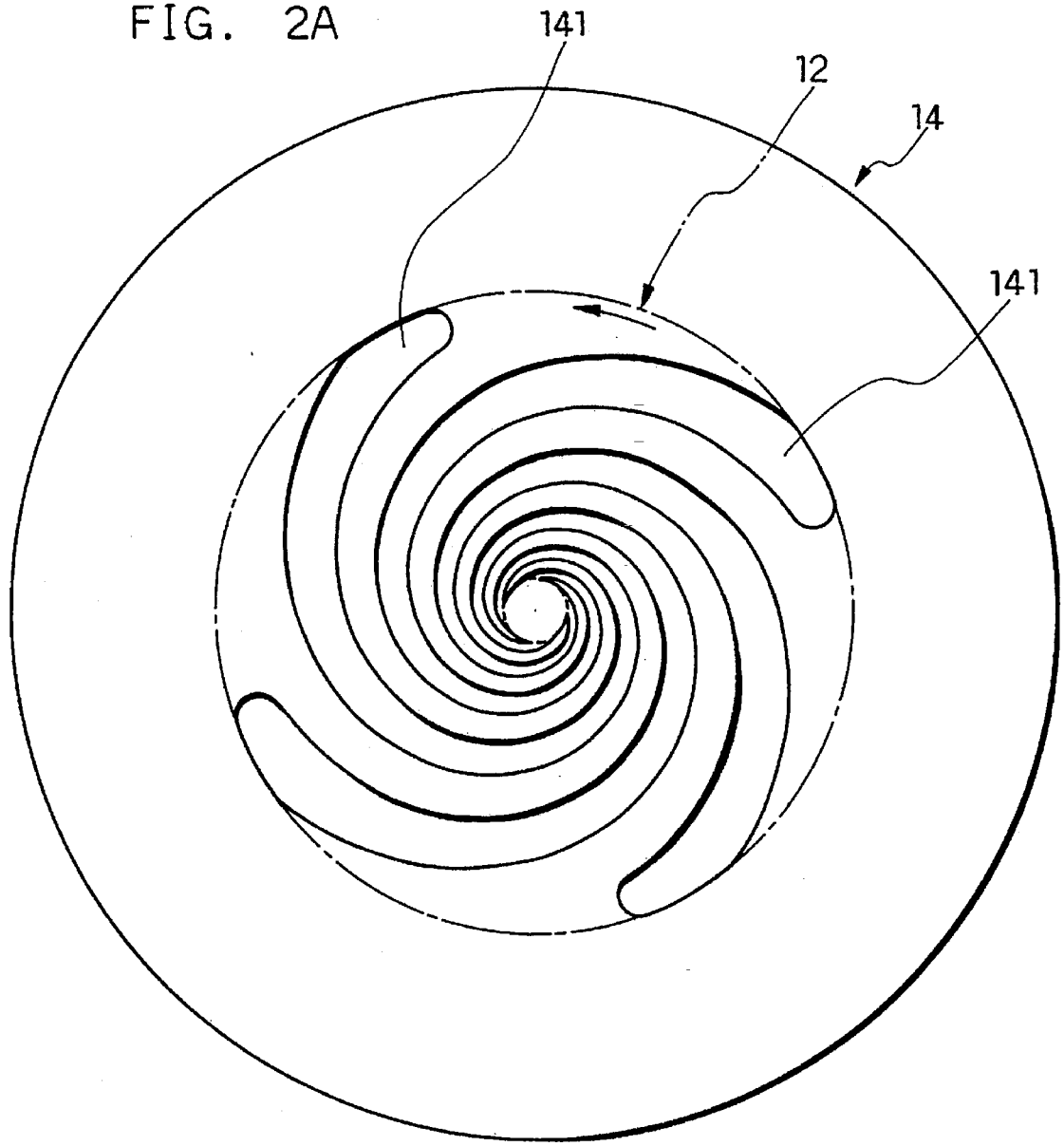
FIG. 2A is an enlarged plan view of a thrust plate 14 of the motor of the embodiment.

As shown in FIG. 2, the thrust plate 14 is provided below the rotating shaft end 12b, for supporting the underside of the shaft end 12b. A plurality of spiral grooves 141 commonly gathering to the center as in the shape shown in FIG. 2A are formed on the thrust plate. When the shaft 12 rotates on the thrust plate 14 in the direction of the arrow (counterclockwise) of FIG. 2A, the spiral grooves 141 generate a dynamic pressure in the lubricant fluid. Accordingly, the dynamic pressure in the lubricant fluid floats up the shaft 12 by about 0.001 to 0.010 mm in the thrusting direction (upward), so that the shaft 12 rotates without contacting the thrust plate 14.

Thus, when the shaft 12 rotates, the dynamic pressure generated in the lubricant fluid causes the rotation to continue without any mechanical contact, only with the intermediary of the lubricant fluid between the shaft 12 and the sleeve 13 and between the shaft 12 and the thrust plate 14. Therefore, the abrasion is prevented on the surfaces of the shaft 12 and the sleeve 13 and the extremely quiet rotation is achieved. As a result of that, no abrasion dust generates from the shaft 12, the sleeve 13 and the thrust plate 14, there occurs neither seizure nor interruption of the motor. And the quiet rotation can be maintained with a high reliability for a long period.

By feeding excitation current to stator coils 15 of the motor, inner-type stator cores 16 create rotating fields. The rotating fields act with an annular permanent magnet 17 of a rotor 18 disposed surrounding the fields and magnetized into multipole, and thereby a rotational driving force generates. The driving magnet 17 is mounted to the inner circumference of the rotor hub 11. Thus the hub 11, the magnet 17 and the shaft 12 make the outer-type rotor 18 as a whole. The stator cores 16 are affixed to a bracket 19 affixed to the housing 3 so as to act as a generator of the driving force.

Steps of Assembling

Figure 3:
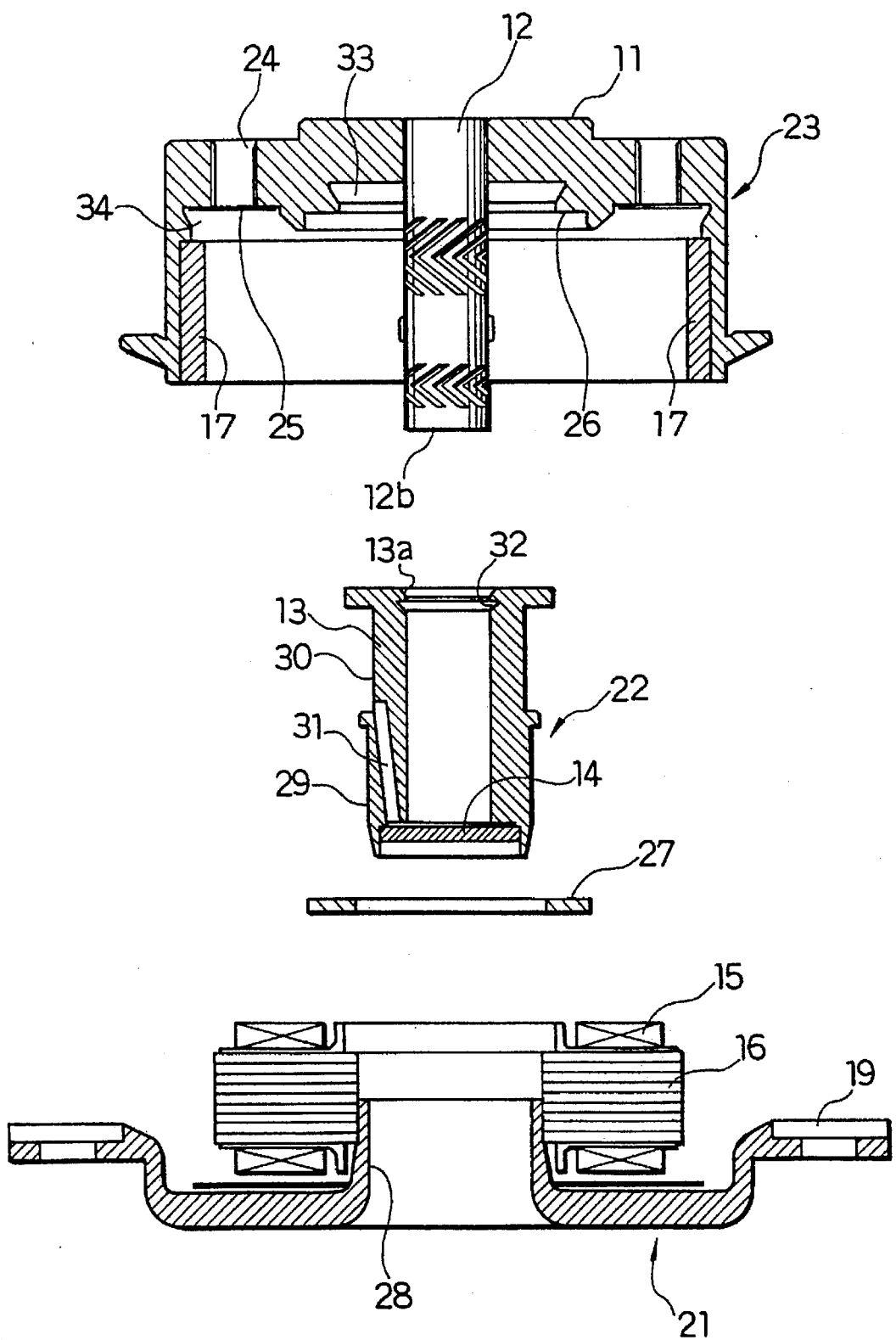
FIG. 3 is an exploded sectional elevation view showing each assembly apart of the motor of the embodiment.
Figure 4:
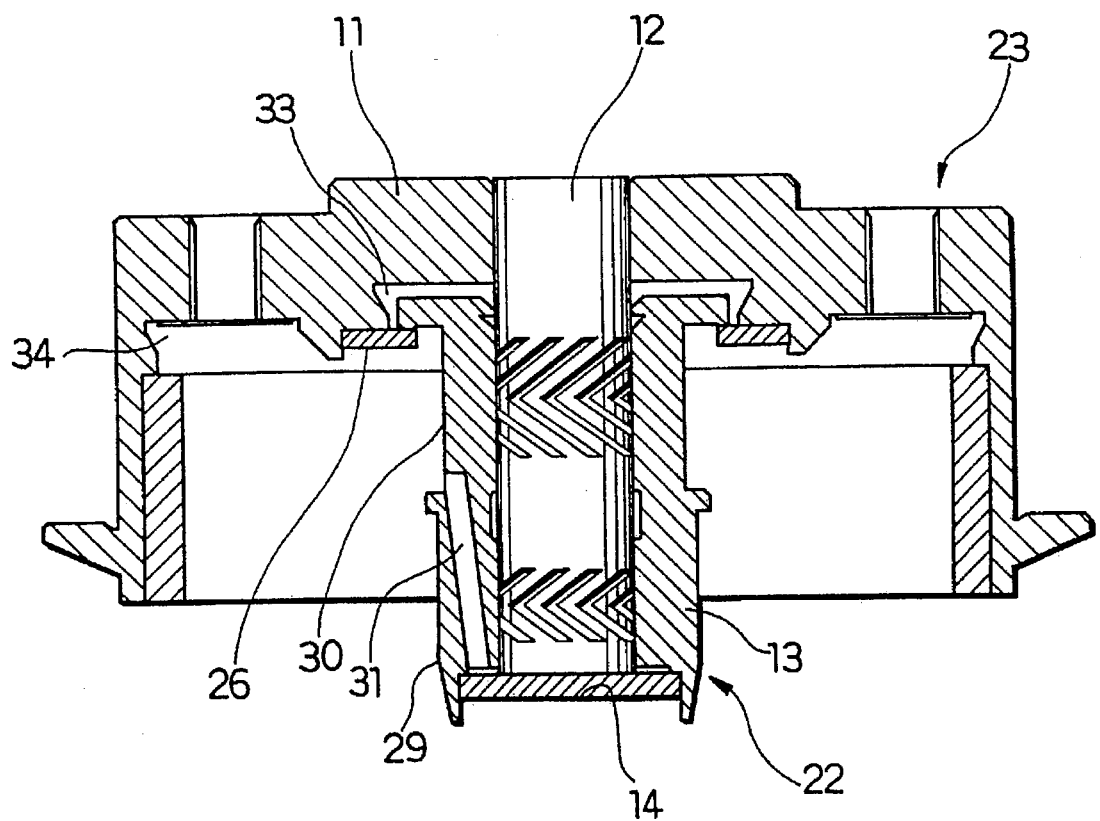
FIG. 4 is a sectional elevation view of a hub assembly of the motor of the embodiment.

Now turning to FIGS. 3 and 4, the steps of assembling the motor 1 will be elucidated in detail.

A bracket assembly 21 is finished by affixing the stator cores 16 previously wound with the stator coils 15 to the bracket 19.

A sleeve assembly 22 is finished by affixing the thrust plate 14 to the lower end surface of the sleeve 13 with caulking method or the like.

A hub assembly 23 is finished by firmly affixing one end of the shaft 12 into the center opening of the hub 11 by means of shrinkage fitting or the like, followed by sticking sealing sheets 25 to tap portions 24 of the hub 11.

In the next step, as shown in FIG. 4, an adequate amount of lubricant fluid is injected into the inside of the sleeve 13 of the sleeve assembly 22, and then the free end of the shaft 12 of the hub assembly 23 is inserted into the aperture of the sleeve 13. After that, fixing plate 26 is affixed to a flat portion 27 of the hub 11 so as to prevent the rotor 18 from coming off.

As the next step, an outer circumferential portion 29 of the sleeve 13 of the sleeve assembly 22 is inserted into a sleeve-like aperture 28 of the bracket 19 of the bracket assembly 21. The assembling of the motor 1 is finished by affixing the outer circumferential portion 29 of the sleeve 13 to the sleeve-like aperture 28 of the bracket 19 with bond or the like in order to affix the sleeve assembly 22.

A communicating aperture 31 is provided on an outer circumferential groove 30 of the sleeve 13 so as to free the air in the sleeve 13 when the shaft 12 is inserted into the sleeve 13. Thereby the air can be exhausted without being shut in the sleeve 13 when inserting the shaft 12, thus enabling the smooth assembling. An annular space 32 for keeping the lubricant fluid injected into the sleeve 13 is provided adjacent to the open side end 13a of the sleeve 13 so as to prevent the lubricant fluid from scattering when inserting the shaft 12. And further, on the hub 11 are formed first oil sump annular space 33 and second oil sump annular space 34. Thus, even in the case that some accident causes the lubricant fluid to scatter from the space 32, the scattering is prevented from transferring into the clean space 8 (shown in FIG. 1) outside the hub 11.

Figure 5:
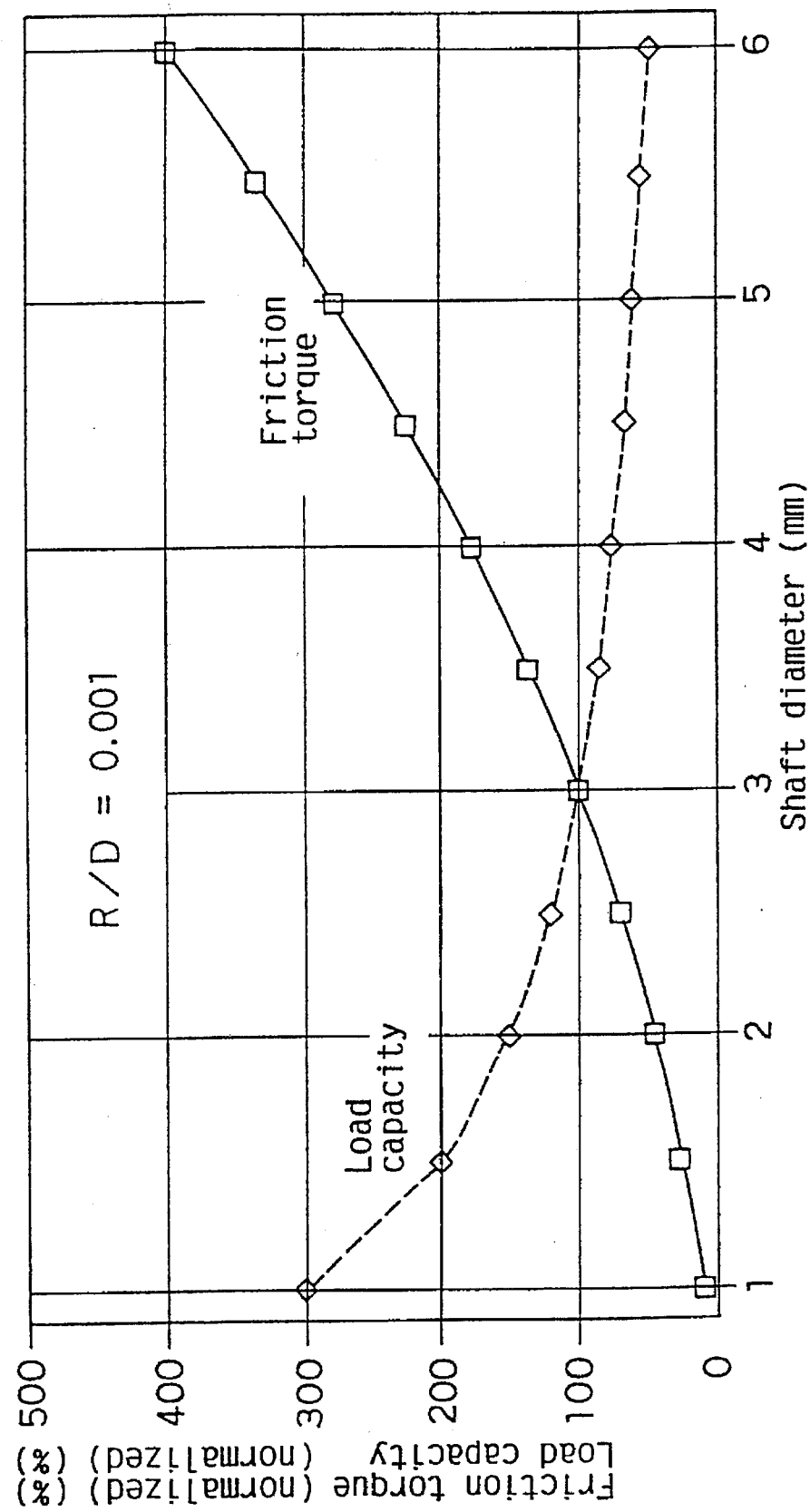
FIG. 5 is a graph showing the relation of the variation of the friction torque and the load capacity with respect to the shaft diameter.

FIG. 5 is a graph showing the variation of the friction torque and the variation of the load capacity with respect to various values of the shaft diameter at the R/D ratio of 0.001. The ordinate of the graph indicates the value made dimensionless (or normalized) indicated in percentage of the friction torque and the load capacity to the same in the case of the shaft diameter of 3 mm. As shown in FIG. 5, the friction torque increases as the shaft diameter increases and the load capacity decreases as the shaft diameter increases.

Figure 6:
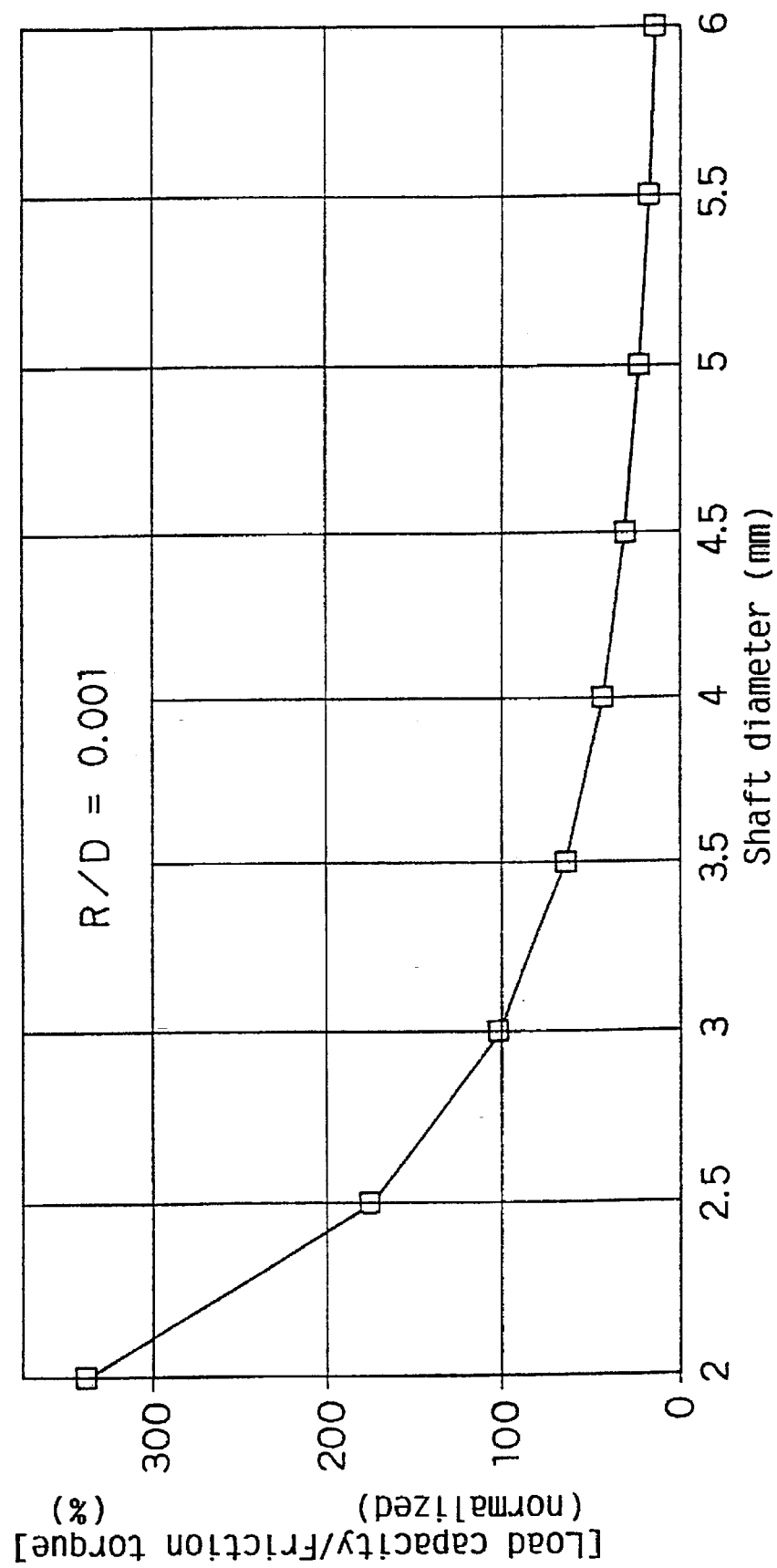
FIG. 6 is a graph showing the relation of the variation of the load capacity/friction torque ratio with respect to the shaft diameter.

FIG. 6 is a graph showing the variation of the ratio of the load capacity to the friction torque with respect to various values of the shaft diameter at the R/D ratio of 0.001, by plotting the dimensionless value indicated in percentage of the ratio similarly in the case of the shaft diameter of 3 mm.

Recent years, there has been a trend of the technological improvements pursuing large capacity and low power consumption of memory disk devices. In the trend, motors of the memory disk devices are required to have the compatibility of low current with high stiffness, each property conflicting with the other. Lowering the motor current requires lowering the friction torque between the shaft and the bearing part in rotating. Enlarging the memory capacity requires increasing the number of the disks mounted to the motor. Increasing the radial stiffness of the bearing part of the motor is required in order to resist the load of the disks rotating at a high speed and heighten the accuracy of the rotation by reducing the runout. On the other hand, as the radial stiffness increases, the friction torque also increases, which obstructs lowering the current. Thus demands of lowering the current and increasing the radial stiffness conflict each other, so that the two demands have been recognized as being difficult to achieve at the same time.

In short, the higher is the ratio, shown in FIG. 6, of the load capacity to the friction torque corresponding to a shaft diameter, the lower current can drive the motor and the higher stiffness the motor has. Accordingly, the ratio is preferably designed as high as possible for the motor of the same capacity.

Conventional bearings, i.e. ball bearings employ the shafts having a diameter in a ranges from 5 mm to 6 mm. In contrast to that, the apparatus of the invention employs a shaft having a diameter of 4 mm or less. Such configuration enables the ratio of the load capacity to the friction torque to be as high as described below. Thus, a motor with both feature of low current and high stiffness is realized.

(1) When the shaft of 6 mm in diameter was replaced by the shaft of 4 mm in diameter, the ratio of the load capacity to the friction torque increased by a factor of 3.4.

(2) When the shaft of 5 mm in diameter was changed for the shaft of 4 mm in diameter, the ratio of the load capacity to the friction torque increased by a factor of 1.9.

In the case of the disc driving apparatus for the memory disks of 3.5 inches type or less, it was found by experiments and calculations that the shaft diameter of 4 mm or less makes possible providing the driving apparatus having both low current and high stiffness from the viewpoint of the demand of the friction torque and the load capacity. Therefore, the shaft diameter of 4 mm or less was found to be the usable range with no trouble in which range the motor has the good balance of the load capacity and the friction torque and has no runout practically.

Figure 7:
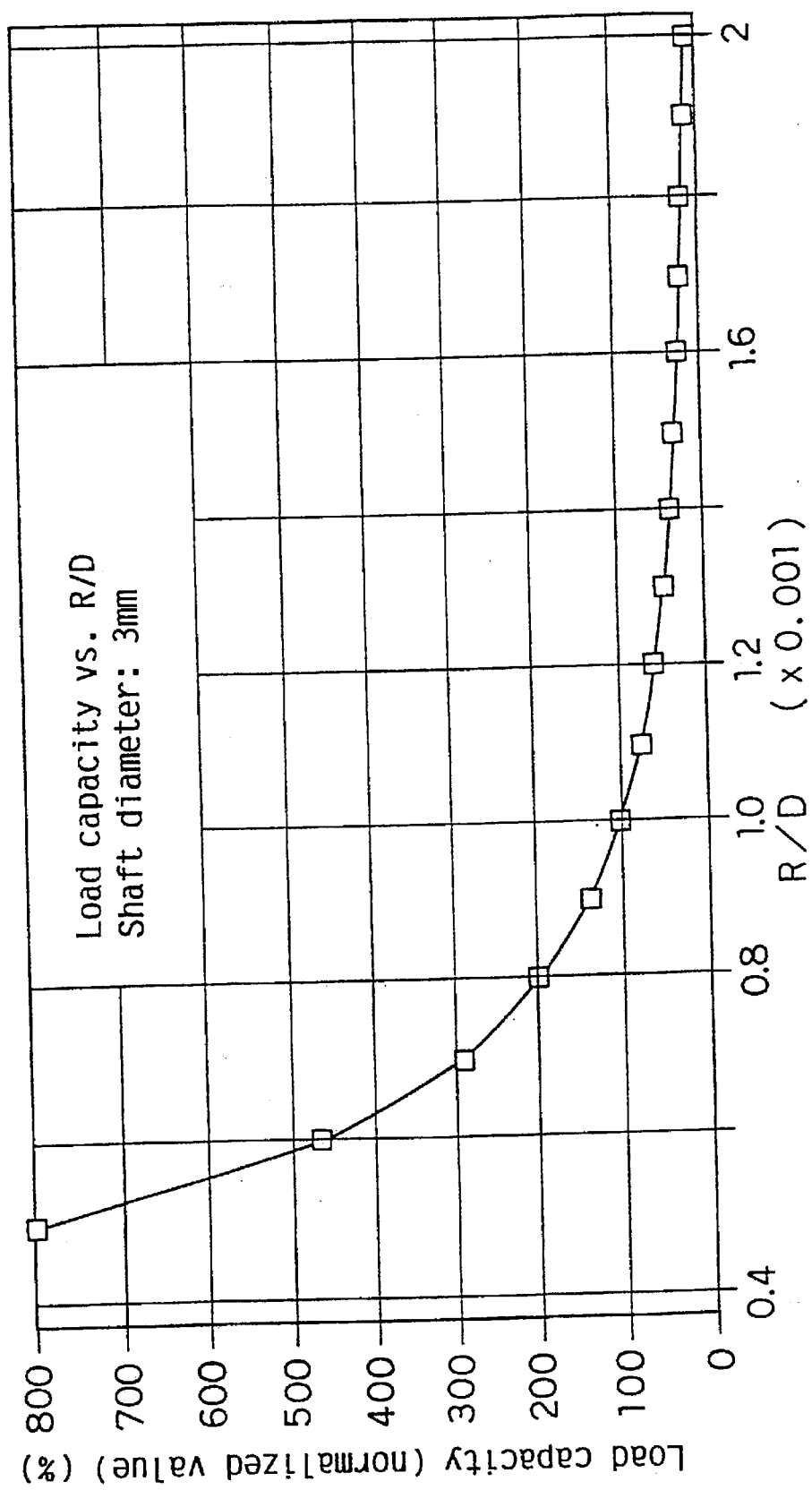
FIG. 7 is a graph showing the relation of the variation of the load capacity with respect to the R/D ratio.

FIG. 7 is a graph showing the variation of the load capacity with respect to the R/D ratio in the case of the shaft diameter of 3 mm by indicating the normalized value of the percentage of the load capacity to the same in the case of the R/D ratio of 0.001.

Figure 8:
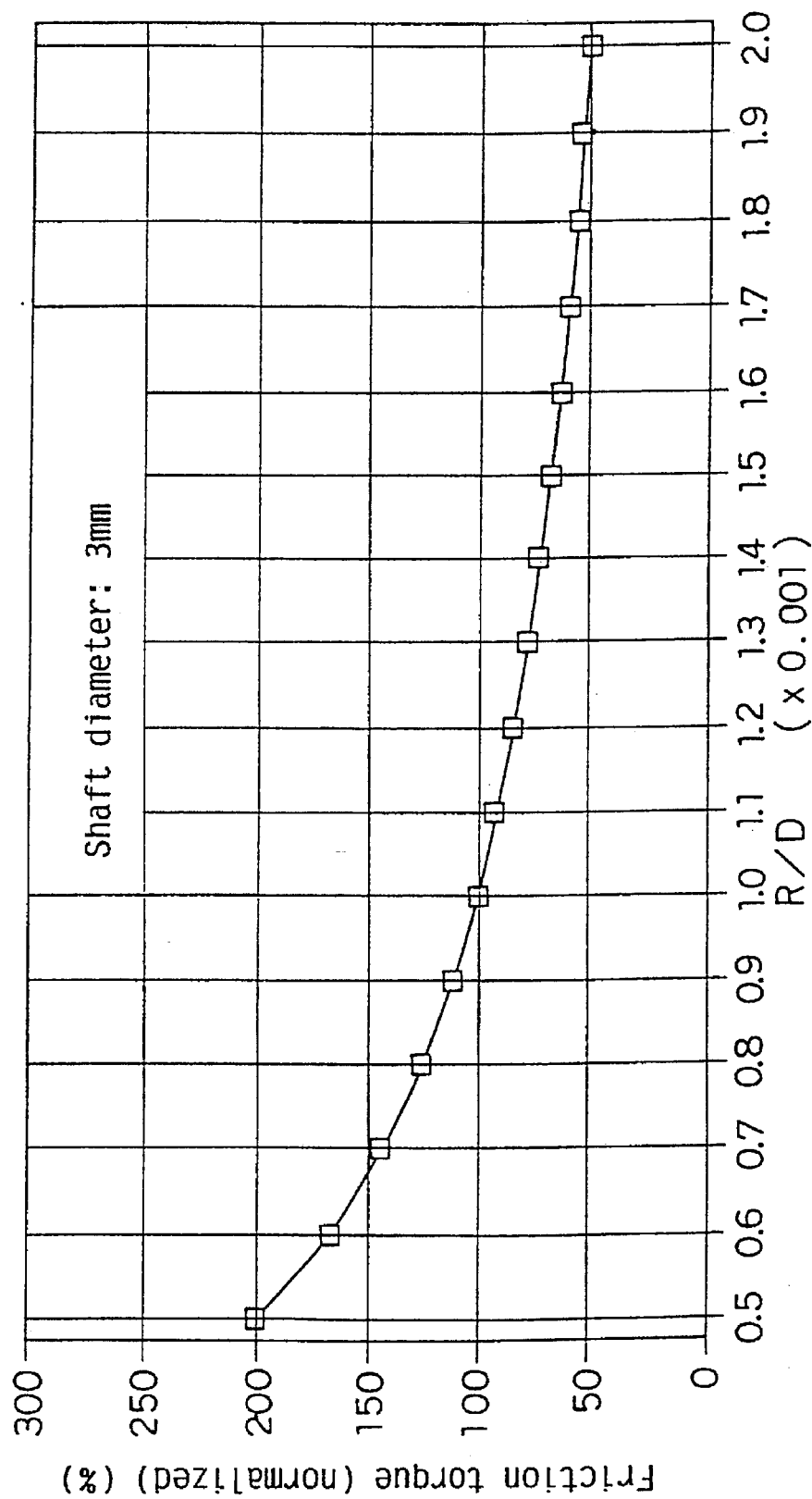
FIG. 8 is a graph showing the relation of the variation of the friction torque with respect to the R/D ratio.

FIG. 8 is a graph showing the variation of the friction torque with respect to the R/D ratio in the case of the shaft diameter of 3 mm by indicating the normalized value of the percentage of the load capacity to the same in the case of the R/D ratio of 0.001.

In the case of the disc driving apparatus for the memory disks of 3.5 inches type or less, without setting an upper limit on the R/D ratio from the viewpoint of the friction torque and the load capacity, high stiffness cannot be maintained. Then, reliable writing cannot be done due to increased runout. Many experiments done by the inventor proved that the driving apparatus having both low current and high stiffness can be provided by making the upper limit of the R/D ratio not more than 0.002.

In such disk driving apparatus as mentioned above, generally, the shaft 12 is made of martensitic stainless steel and the sleeve 13 is made of copper alloy. In such case, as the R/D ratio decreases, the radial gap R decreases in a low temperature because of the difference in the coefficient of linear expansion between the shaft 12 and the sleeve 13. The decrease of radial gap R causes problems such as the increase of required current, the failure in starting, the effect on the precision of the rotation etc. due to the increase of the friction torque. Therefore, there is a limit in decreasing the R/D ratio. Experiments proved that the R/D ratio preferably ranges from 0.0005 to 0.002 in order to keep a required gap even in a low temperature thereby to provide the motor having both low current and high stiffness. In this range, the driving apparatus had a good balance of the load capacity and the friction torque and had no trouble in use. The R/D of 0.0005 or less causes the failure in starting due to the increase of the friction torque and the rise in consumed power due to the increase of the current. This does not satisfy the needs of the market. The R/D of 0.002 or more causes the decrease of the load capacity and the insufficiency of the stiffness. As a result of that, the runout of the disks increases, causing the difficulty or the impossibility of recording onto the disks at a high density. Thus, in such case, it is impossible to satisfy the need for the large capacity, so that the industrial value is small.

The first annular oil sump 33 and the second annular oil sump 34 are provided as measures against the reduction of the amount of the lubricant fluid (oil) injected in the gap between the shaft 12 and the sleeve 13 and in another gap between the shaft 12 and the thrust plate 14 owing to the evaporation, as well as measures against contaminant particles. That is, when the oil injected in the gap between the sleeve 13 and the shaft 12 scatters toward the hub 11, the centrifugal force acting on the oil by the rotation of the motor causes the oil to move outward. Then, the centrifugal force continues to act on the oil collected by the oil sump 33 during the rotation, and the oil remains in the oil sump 33. Accordingly, the scattered oil does not contaminate the ambient area to be clean such as the disks and the head. When the oil scatters from the oil sump 33 by any chance, the oil is caught by the oil sump 34 located further outside. Thus the cleanliness in the closed area inside the housing 3 can be maintained with the low-cost, simple structure.

In the assembled driving apparatus for the disks 6, when electric resistance between the disks 6 and the bracket is very high, the electric spark due to the electricity buildup of the disks 6 takes place, thereby resulting in the damage of data and/or the read error. To prevent this, the resistance between the disks 6 and the bracket is required to be several megohms or less. The resistance between the disks 6 and the bracket is determined by the product of the volume specific resistance of the fluid (oil) and the gap R. In one aspect of the invention, the volume specific resistance of the fluid (oil) is made $3 \times 10^9$ $\Omega$cm or less and the R/D ratio is selected between 0.0005 and 0.002. Thus the resistance between the disks and the bracket can be made several megohms or less without providing conductive magnetic fluid, earthing device of the rotor etc.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A memory disk driving apparatus having a spindle motor comprising:

a dynamic pressure fluid bearing having a sleeve for rotatably supporting a motor shaft inserted into said sleeve, said dynamic pressure fluid bearing having herringbone grooves on either one of said sleeve and said shaft and having lubricant injected into a gap between said shaft and said sleeve, Wherein said herringbone grooves are adapted to apply a dynamic pressure to the lubricant by relative rotation between said shaft and said sleeve, motor shaft has a diameter D of 4 mm or less and ratio (R/D) of the radial gap R between the shaft and the sleeve to the diameter D of the shaft is between 0.0005 and 0.002, said radial gap R being defined by $R=\frac{1}{2} \cdot (Ds-D)$ where Ds is the inner diameter of said sleeve.

2. The memory disk driving apparatus in accordance with claim 1 wherein a disk of said memory disk driving apparatus is 2.5 inches type and diameter of said shaft is 3 mm or less.

3. The memory disk driving apparatus in accordance with claim 1 wherein a disk of said memory disk driving apparatus is 1.8 inches type and diameter of said shaft is 2.5 mm or less.

4. The memory disk driving apparatus in accordance with claim 1 wherein volume specific resistance of said lubricant is $3 \times 10^9$ $\Omega$cm or less.

* * * * *